United States Patent Office.

JOHN T. RANDALL, OF BALTIMORE, MARYLAND.

Letters Patent No. 112,738, dated March 14, 1871.

IMPROVEMENT IN POLISHING COFFEE.

The Schedule referred to in these Letters Patent and making part of the same.

*To whom it may concern:*

Be it known that I, JOHN T. RANDALL, of the city and county of Baltimore and State of Maryland, have invented certain new and useful Improvements in Polishing and Renovating or Improving the Quality and Appearance of Coffee, of which the following is a specification.

It has been usual for many years past to polish and clean coffee by placing it within rotary cylinders, the berries being moistened and sprinkled with soap-stone at times, so as to facilitate the polishing of the coffee, which takes place when, by the revolution of the cylinder, the coffee-berries are caused to rub against one another.

An apparatus adapted for this purpose, and which is equally adapted to my present invention, is described and shown in Letters Patent No. 102,591, granted to me on the 3d of May, 1870. I refer to this apparatus as one well adapted to be used in carrying out my present invention, but I do not desire to be understood as limiting myself to the use of that or any other particular apparatus.

The chief object in using revolving cylinders is to shake up and rub together the coffee-berries, and undoubtedly this object is most readily and easily accomplished by their use. But any other apparatus adapted to produce movement or rubbing together of the berries placed within it may be used.

My invention consists—

First, in the employment, substantially in the manner hereinafter described, of turmeric, either in a liquid or dry state, as an agent for improving the quality and appearance of coffee; and Secondly, in the employment, substantially in the manner hereinafter described, of turmeric, either in a liquid or dry state, in connection with soap-stone or its equivalent, whereby the coffee is polished at the same time that its quality and appearance are improved.

I will now proceed to describe the manner in which my invention is or may be carried into effect with an apparatus substantially such as above specified.

I charge the cylinder with, say, fifteen bags of coffee, weighing about one hundred and sixty pounds each. The charged cylinder is put in motion to clean the coffee and get rid of the dust and foreign matter which escape from the cylinder through the wire-gauze screens formed in its sides. In case I use the turmeric in a liquid form, I then sprinkle over the coffee, say one-half gallon of an extract or infusion of turmeric, which I make beforehand by mixing from eight to ten pounds of pulverized turmeric in about a barrel of hot water. I do not, of course, limit myself to these proportions, as the ratio of turmeric to water may be greater or lesser, according to the strength desired for the extract.

After applying the liquid extract of turmeric to the coffee the cylinder is allowed to revolve for four or five minutes, and I then sprinkle over the coffee about one-half pound of pulverized soap-stone or equivalent substance. This having been done, the cylinder is again put in motion and allowed to revolve for about fifteen minuees, after which I sprinkle over the coffee about one quart of turmeric and one-quarter of a pound of soap-stone. The cylinder is then revolved for about ten minutes longer, and the operation is completed.

The coffee comes out of the cylinder thoroughly cleaned and polished, and having a bright greenish or yellowish color, like that of the berry in its fresh state. This latter effect is due to the turmeric, which, in itself an entirely harmless vegetable substance, has the property of thus improving the quality and appearance of the coffee.

The second quantity of turmeric and soap-stone is put into the cylinder just when the coffee is beginning to be polished, and the addition of these substances at this time serves materially to shorten the time consumed in the operation.

To make a more highly-colored coffee the extract should be stronger, or when an extract of ordinary strength, as above specified, is used, the increased effect may be produced by throwing in an ordinary-sized handfull of pulverized turmeric along with the half pound of soap-stone first put into the cylinder.

The above-described process contemplates the employment of a liquid extract or infusion of turmeric. In case, however, I wish to use turmeric in its dry state, I proceed as follows:

I take the same charge of coffee, and dust and clean it as above specified. I then sprinkle the coffee with water, put the cylinder in motion for about four minutes, and then sprinkle the coffee with pulverized turmeric and soap-stone, preferably mixed together, using from one-eighth to one-quarter of a pound of the former, and about one-half pound of the latter.

I then let the cylinder run or revolve for about fifteen minutes. At the end of this time I sprinkle the coffee, first, with about a quart of water, and afterward, with about three-eighths of a pound of turmeric and soap-stone, preferably mixed, say one-eighth of a pound of turmeric and one-quarter pound of soap-stone. The cylinder is then put in motion for about ten minutes, and the operation is completed.

Coffee thus treated is freed from must and renovated, and will not be nearly so liable thereafter to must as coffee treated in the ordinary way.

I have stated the manner in which my invention may be carried into effect, but I do not desire to be understood as limiting myself to the precise details of the process described, or to the precise proportions of the ingredients stated. These may be greatly varied without departure from the principles of my invention.

What I claim, and desire to secure by Letters Patent, is—

1. The employment, substantially in the manner herein described, of turmeric in the process of renovating coffee.

2. The employment of turmeric and soap-stone conjointly in the process of renovating and polishing coffee, substantially in the manner set forth.

In testimony whereof I have signed my name to this specification before two subscribing witnesses.

JNO. T. RANDALL.

Witnesses:
M. BAILEY,
J. McKENNEY.